United States Patent
Zhang et al.

(10) Patent No.: US 9,898,135 B2
(45) Date of Patent: Feb. 20, 2018

(54) TOUCH DETECTION CIRCUIT AND DISPLAY DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Bin Zhang, Beijing (CN); Chunbing Zhang, Beijing (CN); Yu Xie, Beijing (CN); Zhihan Zhou, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 0 days.

(21) Appl. No.: 15/094,025

(22) Filed: Apr. 8, 2016

(65) Prior Publication Data

US 2016/0313861 A1    Oct. 27, 2016

(30) Foreign Application Priority Data

Apr. 27, 2015    (CN) .......................... 2015 1 0205143

(51) Int. Cl.
  *G06F 3/041*    (2006.01)
  *G06F 3/044*    (2006.01)

(52) U.S. Cl.
  CPC ............ *G06F 3/0418* (2013.01); *G06F 3/044* (2013.01); *G06F 3/0412* (2013.01); *G06F 3/0416* (2013.01)

(58) Field of Classification Search
  CPC ...... G06F 3/0418; G06F 3/0416; G06F 3/044; G06F 3/0412
  See application file for complete search history.

(56) References Cited

U.S. PATENT DOCUMENTS

| 2013/0300692 | A1  | 11/2013 | Jang et al. |
| 2014/0232691 | A1* | 8/2014  | Lee ......................... G06F 3/044 345/174 |
| 2014/0368467 | A1* | 12/2014 | Park ...................... G06F 3/0412 345/174 |

FOREIGN PATENT DOCUMENTS

| CN | 102460357 A | 5/2012 |
| CN | 102725715 A | 10/2012 |
| CN | 102736964 A | 10/2012 |

OTHER PUBLICATIONS

First Office Action dated Apr. 17, 2017 corresponding to Chinese application No. 201510205143.0.
Office Action dated Nov. 1, 2017 in corresponding Chinese Application No. 201510205143.0.

* cited by examiner

*Primary Examiner* — Liliana Cerullo
(74) *Attorney, Agent, or Firm* — Nath, Goldberg & Meyer; Joshua B. Goldberg

(57) ABSTRACT

The present invention provides a touch detection circuit and a display device, and belongs to the field of display technology. In the touch detection circuit of the present invention, when a signal detection unit detects a change in a common voltage signal of a common electrode, a switch unit is controlled to be turned off, so as to avoid inaccurate detection of a touch position due to a spike pulse in the common voltage signal of the common electrode. The touch detection circuit of the present invention detects a touch position accurately and is simple in structure.

18 Claims, 1 Drawing Sheet

TOUCH DETECTION CIRCUIT AND DISPLAY DEVICE

CROSS-REFERENCE TO RELATED APPLICATION

This application claims the benefit of priority to China Patent Application No. 201510205143.0, titled "Touch Detection Circuit and Display Device" and filed on Apr. 27, 2015, the content thereof being incorporated herein by reference.

FIELD OF THE INVENTION

The present invention belongs to the field of display technology, and particularly relates to a touch detection circuit and a display device.

BACKGROUND OF THE INVENTION

An existing touch display device usually comprises a liquid crystal display panel, and a touch panel arranged on the liquid crystal display panel.

The liquid crystal display panel is mainly formed by assembling an array substrate and a color filter substrate. The array substrate is provided thereon with gate lines and data lines which are arranged to intersect in a grid form (the gate line and the data line are located in different layers, and thus are not electrically connected with each other while intersecting). The gate lines and the data lines intersect to define pixel units, and each pixel unit comprises a thin film transistor, a pixel electrode connected with a drain of the thin film transistor, and a common electrode. Gates of the thin film transistors of the pixel units in one row are connected with the same gate line, and sources of the thin film transistors of the pixel units in one column are connected with the same data line. When a gate line is activated, only by controlling a signal of each data line, the row of pixel units corresponding to said gate line can display desired content at the same time. Therefore, only by activating (also called scanning) all the gate lines in turn, a display screen of the display device can display desired content. The touch panel comprises a first sensing line and a second sensing line which intersect and are insulated from each other, wherein a first coupling capacitance is generated in an overlap position of the first sensing line and the common electrode; a second coupling capacitance is generated in an overlap position of the second sensing line and the common electrode; and a by-pass capacitance is generated at an intersection point of the first sensing line and the second sensing line, and a touch position is determined by detecting change in the by-pass capacitance.

The inventors have found that at least the following problem exists in the prior art: after a row of pixel units are scanned, a potential on the gate line that turns on said row of pixel units is changed from a high potential to a low potential (or from a low potential to a high potential), and a data voltage signal applied from a data line to the pixel unit corresponding thereto will jump at the moment of said change. The jump of the data voltage signal on said data line will cause a common voltage signal on the common electrode to have a spike pulse. Said change in the common voltage signal on the common electrode will lead to changes in the first coupling capacitance, the second coupling capacitance and the by-pass capacitance, and further result in inaccurate detection of the touch position.

SUMMARY OF THE INVENTION

In view of the foregoing problem of the existing touch display device, an object of the present invention is to provide a touch detection circuit which is simple in structure and accurately detects a touch position, and a display device.

One aspect of the present invention provides a touch detection circuit used in a touch display device, which is configured to detect a touch operation performed on a touch panel of the touch display device, and the touch display device comprises a common electrode, a first sensing line, and a second sensing line; a first coupling capacitance is generated in an overlap position of the first sensing line and the common electrode; a second coupling capacitance is generated in an overlap position of the second sensing line and the common electrode; and a by-pass capacitance is generated at an intersection point of the first sensing line and the second sensing line, and the touch detection circuit comprises:

a touch drive signal input unit, which is connected with the first sensing line, and is configured to output a touch drive signal, which is a square wave signal, to the first sensing line;

a signal conversion unit, which is connected with the second sensing line, and is configured to convert a square wave signal outputted from the second sensing line to a spike pulse signal;

a signal detection unit, which is connected with the common electrode, and is configured to detect a change in a common voltage signal on the common electrode; and a switch unit, which is connected with the signal conversion unit and the signal detection unit, and is configured to be turned off when the signal detection unit detects a change in the common voltage signal on the common electrode.

Optionally, the signal conversion unit is a differential circuit.

Further optionally, the differential circuit comprises a first operational amplifier and a feedback resistor;

a positive input terminal of the first operational amplifier is connected to a first reference voltage, an inverting input terminal of the first operational amplifier is connected with the second sensing line, and an output terminal of the first operational amplifier is connected with the switch unit; and the feedback resistor is connected between the inverting input terminal and the output terminal of the first operational amplifier.

Further optionally, the touch detection circuit further comprises an integral circuit, the integral circuit is connected with the switch unit, and is configured to correct a signal outputted from the differential circuit and output the corrected signal when the switch unit is turned on.

Further optionally, the integral circuit comprises a second operational amplifier, a resistor, a capacitor and a reset switch;

the resistor is connected between an inverting input terminal of the second operational amplifier and the switch unit;

the capacitor is connected between the inverting input terminal and an output terminal of the second operational amplifier; a positive input terminal of the second operational amplifier is connected to a second reference voltage; and the reset switch is connected between two terminals of the capacitor.

Further optionally, the touch detection circuit further comprises a control unit;

the control unit is connected with an output terminal of the integral circuit, and is configured to determine a position of a touch point according to an output of the integral circuit.

Optionally, the touch display device further comprises a gate line, and the signal detection unit is further connected with the gate line, and is configured to control the switch unit to be turned off when detecting that a signal on the gate line jumps.

Optionally, the switch unit is a single-pole switch.

A technical solution employed to solve the technical problem in the present invention is a display device, comprising a plurality of the foregoing touch detection circuits.

Optionally, the plurality of touch detection circuits are connected with the same control unit.

The present invention has the following beneficial effects: the signal detection unit and the switch unit are added to the touch detection circuit of the present invention, and the change in the common voltage signal is detected by the signal detection unit. Without interference resulting from a change in a data voltage signal on a data line or interference from other signals, the common voltage signal should be a continuously steady level signal. If it is detected that a spike pulse occurs in the common voltage signal, which indicates that a signal on the common electrode is subject to interference at the moment, the switch unit is turned off at the moment so as to prevent the signal conversion unit from outputting a false spike pulse signal, thereby avoiding inaccurate detection of a touch position.

The display device of the present invention includes the forgoing touch detection circuit and is thus low in power consumption and more accurate in touch detection.

DESCRIPTION OF THE PREFERRED EMBODIMENT

In order to make those skilled in the art better understand the technical solutions of the present invention, the present invention will be further described in detail below with reference to the accompanying drawings and specific implementations.

Embodiment 1

Figure 1:
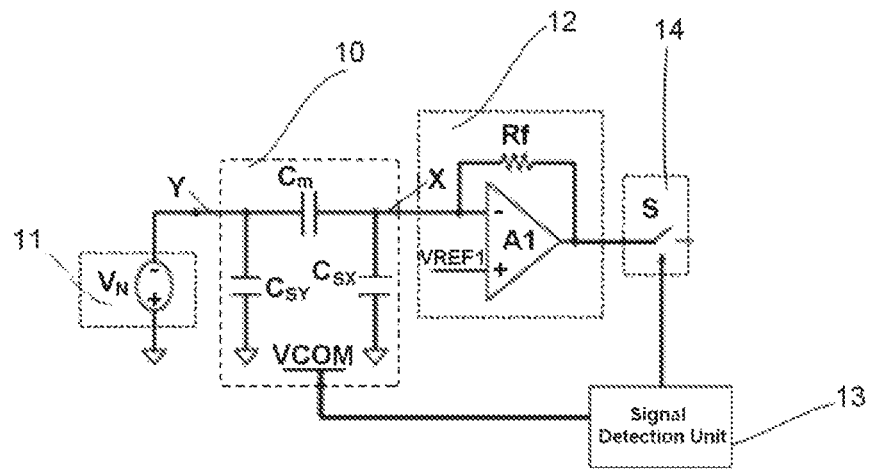
FIG. 1 is a schematic diagram of an exemplary configuration of a touch detection circuit in Embodiment 1 of the present invention.

As shown in FIG. 1, this embodiment provides a touch detection circuit used in a touch display device, which is used for detecting touch operation on a touch panel 10 of the touch display device. The touch display device comprises a common electrode (not shown). The touch panel 10 comprises a first sensing line Y, and a second sensing line X. A first coupling capacitance Csy is generated in an overlap position of the first sensing line Y and the common electrode; a second coupling capacitance Csx is generated in an overlap position of the second sensing line X and the common electrode; and a by-pass capacitance Cm is generated at an intersection point of the first sensing line Y and the second sensing line X. It should be understood that, for ease of illustration, the touch panel 10 shown in the drawing is merely a simplified diagram for schematically describing a function of the touch panel 10. For example, although the drawing illustrates only one first sensing line Y and one second sensing line X, the touch panel 10 may actually comprise a plurality of first sensing lines Y and a plurality of second sensing lines X. Various configurations of the touch panel 10 are well known in the art and thus will not be repeated here.

The touch detection circuit in this embodiment comprises: a touch drive signal input unit 11, which is connected with the first sensing line Y, and is used for outputting a touch drive signal, which is a square wave signal, to the first sensing line Y; a signal conversion unit 12, which is connected with the second sensing line X, and is used for converting a square wave signal outputted from the second sensing line X into a spike pulse signal; a signal detection unit 13, which is connected with the common electrode, and is used for detecting change in a common voltage signal on the common electrode; and a switch unit 14, which is connected with the signal conversion unit 12 and the signal detection unit 13, and is configured to be turned off when the signal detection unit 13 detects a change in the common voltage signal on the common electrode.

As compared with a touch detection circuit in the prior art, the touch detection circuit in this embodiment incorporates the signal detection unit 13 and the switch unit 14, and the change in the common voltage signal is detected by the signal detection unit 13. Without interference resulting from a change in a data voltage signal on a data line or interference from other signals, the common voltage signal should be a continuously steady level signal. If it is detected that spike pulse occurs in the common voltage signal, which indicates that a signal on the common electrode is subject to interference at the moment, the switch unit 14 is turned off so as to prevent the signal conversion unit 12 from outputting a false spike pulse signal, thereby avoiding inaccurate detection of a touch position. When the common voltage signal detected by the signal detection unit 13 returns to a steady state, the switch unit 14 is turned on, so that the spike pulse signal is outputted from the signal conversion unit 12 and used for determining the touch position.

Optionally, the signal conversion unit 12 in this embodiment is a differential circuit. It can be known by those skilled in the art that the differential circuit can convert a square wave signal into a spike pulse signal.

In a specific example, the differential circuit comprises a first operational amplifier A1 and a feedback resistor $R_f$; a positive input terminal of the first operational amplifier A1 is connected to a first reference voltage VREF1, an inverting input terminal of the first operational amplifier A1 is connected with the second sensing line X, and an output terminal of the first operational amplifier A1 is connected with the switch unit 14; and the feedback resistor $R_f$ is connected between the inverting input terminal and the output terminal of the first operational amplifier A1.

Specifically, as shown in FIG. 1, the touch drive signal input unit 11 outputs a square wave signal to the first sensing line Y, and said square wave signal is inputted to the inverting input terminal of the first operational amplifier A1 of the differential circuit via the second sensing line X. At that moment, the output terminal of the first operational amplifier A1 of the differential circuit outputs a spike pulse signal. Meanwhile, the signal detection unit 13 detects the change in the common voltage signal on the common electrode, and controls the switch unit 14 to be turned on or turned off according to a detection result. When no change in the common voltage signal is detected, the switch unit 14 is turned on so as to output the spike pulse signal, and the touch position is determined according to the spike pulse signal. When the detected common voltage signal has a spike pulse, the switch unit 14 is controlled to be turned off so as to prevent the differential circuit from outputting the spike pulse signal, thereby avoiding inaccurate detection of the touch position.

Embodiment 2

Figure 2:
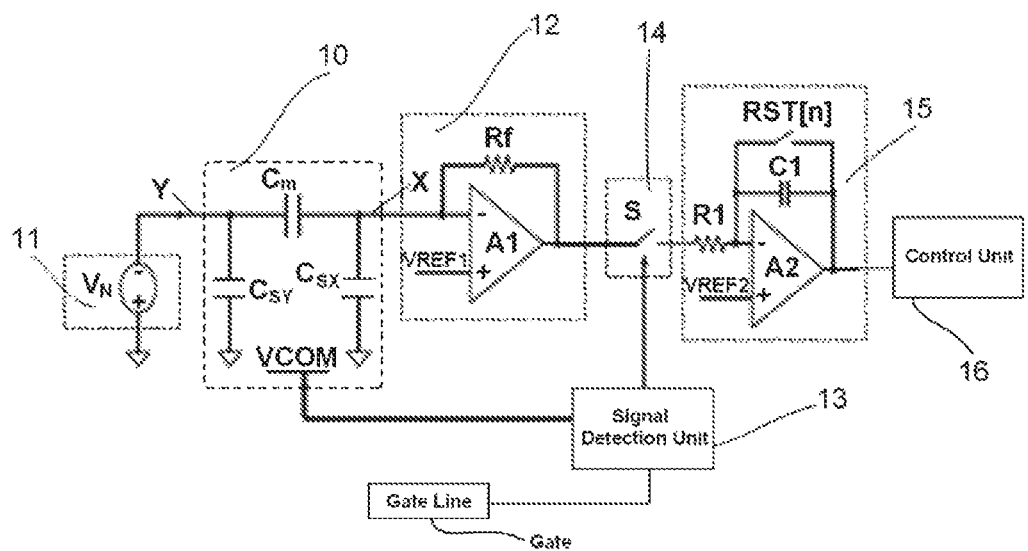
FIG. 2 is a schematic diagram of an exemplary configuration of a touch detection circuit in Embodiment 2 of the present invention.

This embodiment provides a touch detection circuit used in a touch display device, which is used for detecting touch operation on a touch panel 10 of the touch display device. As shown in FIG. 2, this embodiment differs from Embodiment 1 in that the signal detection unit 13 is further connected with a gate line of the touch display device, and the switch unit 14 is connected with an integral circuit 15.

The touch detection circuit of this embodiment will be described in detail below with reference to FIG. 2. Similar to Embodiment 1, when the signal detection unit 13 detects that a signal on the gate line jumps, that is, when a spike pulse occurs in the common voltage signal, the switch unit 14 is controlled to be turned off so as to prevent the differential circuit from outputting the spike pulse signal, thereby avoiding inaccurate detection of the touch position.

In addition, the touch detection circuit in this embodiment further comprises the integral circuit 15, which is connected with the switch unit 14, and is used for correcting a signal outputted from an output terminal of the differential circuit and outputting the corrected signal when the switch unit 14 is turned on. This is because the spike pulse signal outputted from the differential circuit 12 has a phase delay of 90 degrees relative to the square wave signal. In this embodiment, with the integral circuit 15, the phase delay of 90 degrees of the spike pulse signal can be corrected, so as to simplify subsequent analysis of the touch position. Optionally, the touch detection circuit further comprises a control unit 16, which is connected with the integral circuit 15, and is used for determining a position of a touch point.

Further optionally, the integral circuit 15 comprises a second operational amplifier A2, a resistor R1, a capacitor C1 and a reset switch RST[n]. The resistor R1 is connected between an inverting input terminal of the second operational amplifier A2 and the switch unit 14; the capacitor C1 is connected between the inverting input terminal and an output terminal of the second operational amplifier A2; a positive input terminal of the second operational amplifier A2 is connected to a second reference voltage VREF2; and the reset switch RST[n] is connected between two terminals of the capacitor C1.

In this embodiment, the switch unit 14 may be a single-pole switch S, which has a simple structure and can be easily controlled. Other switching devices well known to those skilled in the art may also be used.

Embodiment 3

This embodiment provides a display device, comprising a plurality of touch detection circuits, each of which is the touch detection circuit according to any one of the foregoing embodiments. Each touch detection circuit is connected with one first sensing line Y and one second sensing line X, and all the touch detection circuits may be connected with the same control unit 16 so as to achieve detection of a touch position.

The display device may be any product or component having a display function and a touch function, such as a liquid crystal panel, electronic paper, a mobile phone, a tablet computer, a TV set, a monitor, a notebook computer, a digital photo frame, or a navigator.

The display device of this embodiment includes the foregoing touch detection circuit, and is thus low in power consumption and more accurate in detection.

It should be understood that the foregoing implementations are merely exemplary implementations adopted for describing the principle of the present invention, but the present invention is not limited thereto. Those of ordinary skill in the art may make various variations and improvements without departing from the spirit and essence of the present invention, and these variations and improvements shall be considered to fall into the protection scope of the present invention.

The invention claimed is:

1. A touch detection circuit used in a touch display device, which is configured to detect a touch operation performed on a touch panel of the touch display device, wherein the touch display device comprises a common electrode, a first sensing line, and a second sensing line; a first coupling capacitance is generated in an overlap position of the first sensing line and the common electrode; a second coupling capacitance is generated in an overlap position of the second sensing line and the common electrode; and a by-pass capacitance is generated at an intersection point of the first sensing line and the second sensing line; and the touch detection circuit comprises:
   a touch drive signal input unit, which is connected with the first sensing line, and is configured to output a touch drive signal, which is a square wave signal, to the first sensing line;
   a signal conversion unit, which is connected with the second sensing line, and is configured to convert a square wave signal outputted from the second sensing line into a spike pulse signal;
   a signal detection unit, which is connected with the common electrode, and is configured to detect a change in a common voltage signal on the common electrode; and
   a switch unit, which is connected with the signal conversion unit and the signal detection unit, and is configured to be turned off when the signal detection unit detects a change in the common voltage signal on the common electrode;
   wherein the signal detection unit controls the switch unit to be turned on or turned off, and the switch unit is configured to transmit, when turned on, the spike pulse signal generated by the signal conversion unit.

2. The touch detection circuit according to claim 1, wherein the signal conversion unit is a differential circuit.

3. The touch detection circuit according to claim 2, wherein the differential circuit comprises a first operational amplifier and a feedback resistor;
   a positive input terminal of the first operational amplifier is connected to a first reference voltage, an inverting input terminal of the first operational amplifier is connected with the second sensing line, and an output terminal of the first operational amplifier is connected with the switch unit; and
   the feedback resistor is connected between the inverting input terminal and the output terminal of the first operational amplifier.

4. The touch detection circuit according to claim 3, further comprising an integral circuit, wherein
   the integral circuit is connected with the switch unit, and is configured to correct a signal outputted from the differential circuit and output the corrected signal when the switch unit is turned on.

5. The touch detection circuit according to claim 4, wherein the integral circuit comprises a second operational amplifier, a resistor, a capacitor and a reset switch;
the resistor is connected between an inverting input terminal of the second operational amplifier and the switch unit;
the capacitor is connected between the inverting input terminal and an output terminal of the second operational amplifier;
a positive input terminal of the second operational amplifier is connected to a second reference voltage; and
the reset switch is connected between two terminals of the capacitor.

6. The touch detection circuit according to claim 4, further comprising a control unit, wherein
the control unit is connected with an output terminal of the integral circuit, and is configured to determine a position of a touch point according to an output of the integral circuit.

7. The touch detection circuit according to claim 2, further comprising an integral circuit, wherein
the integral circuit is connected with the switch unit, and is configured to correct a signal outputted from the differential circuit and output the corrected signal when the switch unit is turned on.

8. The touch detection circuit according to claim 7, wherein the integral circuit comprises a second operational amplifier, a resistor, a capacitor and a reset switch;
the resistor is connected between an inverting input terminal of the second operational amplifier and the switch unit;
the capacitor is connected between the inverting input terminal and an output terminal of the second operational amplifier;
a positive input terminal of the second operational amplifier is connected to a second reference voltage; and
the reset switch is connected between two terminals of the capacitor.

9. The touch detection circuit according to claim 7, further comprising a control unit, wherein
the control unit is connected with an output terminal of the integral circuit, and is configured to determine a position of a touch point according to an output of the integral circuit.

10. The touch detection circuit according to claim 1, wherein the touch display device further comprises a gate line, and the signal detection unit is further connected with the gate line, and is configured to control the switch unit to be turned off when detecting that a signal on the gate line jumps.

11. The touch detection circuit according to claim 1, wherein the switch unit is a single-pole switch.

12. A display device, comprising a plurality of touch detection circuits, each of which is the touch detection circuit according to claim 1.

13. The display device according to claim 12, wherein the plurality of touch detection circuits are connected with a same control unit.

14. The display device according to claim 12, wherein the signal conversion unit is a differential circuit.

15. The display device according to claim 14, wherein the differential circuit comprises a first operational amplifier and a feedback resistor;
a positive input terminal of the first operational amplifier is connected to a first reference voltage, an inverting input terminal of the first operational amplifier is connected with the second sensing line, and an output terminal of the first operational amplifier is connected with the switch unit; and
the feedback resistor is connected between the inverting input terminal and the output terminal of the first operational amplifier.

16. The display device according to claim 14, wherein the touch detection circuit further comprises an integral circuit,
the integral circuit is connected with the switch unit, and is configured to correct a signal outputted from the differential circuit and output the corrected signal when the switch unit is turned on.

17. The display device according to claim 16, wherein the integral circuit comprises a second operational amplifier, a resistor, a capacitor and a reset switch;
the resistor is connected between an inverting input terminal of the second operational amplifier and the switch unit;
the capacitor is connected between the inverting input terminal and an output terminal of the second operational amplifier;
a positive input terminal of the second operational amplifier is connected to a second reference voltage; and
the reset switch is connected between two terminals of the capacitor.

18. The display device according to claim 16, wherein the touch detection circuit further comprises a control unit;
the control unit is connected with an output terminal of the integral circuit, and is configured to determine a position of a touch point according to an output of the integral circuit.

* * * * *